US007589893B2

(12) United States Patent
Rottcher

(10) Patent No.: US 7,589,893 B2
(45) Date of Patent: Sep. 15, 2009

(54) WALL ELEMENT WITH CUT-OUT FOR FLAT SCREEN DISPLAY

(75) Inventor: Oliver Rottcher, Gottmadingen (DE)

(73) Assignee: Mirror Image AG, Steinach (CH)

( * ) Notice: Subject to any disclaimer, the term of this patent is extended or adjusted under 35 U.S.C. 154(b) by 507 days.

(21) Appl. No.: 11/136,139

(22) Filed: May 24, 2005

(65) Prior Publication Data

US 2005/0257435 A1 Nov. 24, 2005

Related U.S. Application Data

(63) Continuation-in-part of application No. 09/883,729, filed on Jun. 18, 2001, now Pat. No. 7,455,412.

(30) Foreign Application Priority Data

Jun. 24, 2000 (DE) ................................ 100 30 960
Feb. 2, 2001 (DE) ................................ 101 04 644

(51) Int. Cl.
*G03B 21/56* (2006.01)
*G02B 5/08* (2006.01)
*G09G 1/14* (2006.01)

(52) U.S. Cl. ....................... 359/443; 359/460; 359/839; 40/900; 345/24

(58) Field of Classification Search ..................... 359/1, 359/35, 449, 460, 455, 838–839, 800, 74, 359/830, 119, 443; 40/900; 345/24, 76; 348/748
See application file for complete search history.

(56) References Cited

U.S. PATENT DOCUMENTS 1,680,016 A 8/1928 Searle
1,849,708 A 3/1932 Colbert et al.
2,221,888 A 11/1940 White
2,221,889 A 11/1940 Cantelo
4,202,607 A 5/1980 Washizuka et al.
4,517,040 A 5/1985 Whitted (Continued)

FOREIGN PATENT DOCUMENTS

DE 29916732 U1 * 3/2000

(Continued)

OTHER PUBLICATIONS

"Lake Las Vegas homeowners show creativity." located at http://lasvegasnewspapers.com/realestate/REMay-21-Sun-2000/Front/13554146.html: retrieved on Dec. 17, 2004 (2 pages).

(Continued)

*Primary Examiner*—Diane I Lee
*Assistant Examiner*—Magda Cruz
(74) *Attorney, Agent, or Firm*—Morrison & Foerster LLP

(57) ABSTRACT

A wall panel has a glass outer face which in turn is provided with a decorative design, for example by painting, mirroring, partial mirroring, coating, printing or else placing an inlay or the like behind it. In addition, this wall panel is designed to cooperate with a flat screen in such a way that the decorative design forms a cut-out adapted to the flat screen, through which cut-out the image display can then be viewed on the user side.

18 Claims, 8 Drawing Sheets

U.S. PATENT DOCUMENTS

| | | | | |
|---|---|---|---|---|
| 4,588,267 | A | | 5/1986 | Pastore |
| 4,630,904 | A | | 12/1986 | Pastore |
| 4,747,223 | A | * | 5/1988 | Borda ......................... 40/219 |
| 4,765,076 | A | | 8/1988 | Sada |
| D299,491 | S | | 1/1989 | Masuda |
| D300,642 | S | | 4/1989 | Pawlik et al. |
| 5,095,375 | A | * | 3/1992 | Bolt .............................. 359/1 |
| 5,123,192 | A | | 6/1992 | Hsieh et al. |
| 5,148,283 | A | | 9/1992 | Taddeo |
| 5,210,967 | A | | 5/1993 | Brown |
| 5,228,879 | A | | 7/1993 | Fromm |
| 5,416,313 | A | | 5/1995 | Larson et al. |
| 5,631,638 | A | | 5/1997 | Kaspar et al. |
| 5,642,238 | A | | 6/1997 | Sala |
| 5,887,369 | A | | 3/1999 | Danielczak |
| 5,956,181 | A | | 9/1999 | Lin |
| 5,993,006 | A | | 11/1999 | Takeuchi et al. |
| 6,106,121 | A | | 8/2000 | Buckley et al. |
| 6,152,551 | A | * | 11/2000 | Annas ........................ 312/224 |
| 6,172,613 | B1 | | 1/2001 | Deline et al. |
| 6,200,010 | B1 | | 3/2001 | Anders |
| 6,320,591 | B1 | | 11/2001 | Griencewic |
| 6,560,027 | B2 | | 6/2002 | Meine |
| 6,477,464 | B2 | | 11/2002 | McCarthy et al. |
| 6,543,163 | B1 | | 4/2003 | Ginsberg |
| 6,642,840 | B2 | | 11/2003 | Lang et al. |
| 6,650,470 | B1 | | 11/2003 | Turner et al. |

FOREIGN PATENT DOCUMENTS

| | | |
|---|---|---|
| DE | 299 16 732 U1 | 5/2000 |
| EP | 0 552 768 | 7/1993 |
| EP | 0 937 601 | 8/1999 |
| FR | 2 586 182 | 2/1987 |
| FR | 2 738 931 | 3/1997 |
| GB | 2 274 733 | 8/1994 |
| JP | 08-173285 | 7/1996 |
| JP | 08-308700 | 11/1996 |
| WO | WO-95/23401 | 8/1995 |

OTHER PUBLICATIONS

German Office Action dated Aug. 28, 2007 directed to counterpart German Application No. 01 115 047.1-2214/1168285.

* cited by examiner

WALL ELEMENT WITH CUT-OUT FOR FLAT SCREEN DISPLAY

CROSS REFERENCE TO RELATED APPLICATION

The instant application is a continuation-in-part of application Ser. No. 09/883,729 filed Jun. 18, 2001 now U.S. Pat. No. 7,455,412.

BACKGROUND OF THE INVENTION

The present invention relates to a modular large wall element for interior design, wherein the wall element is suitable for displaying information at the same time.

Such devices are generally known in the form of partition or exhibition walls and also for flexible advertising purposes and comprise as the essential component a large wall panel, the outer face of which on the user side is configured decoratively in the intended manner, for example by applying designs in the form of logos, pictures, text or the like.

However, such known wall elements have the disadvantage firstly that they are inflexible in terms of their configuration; typically, by (manually) applying the design, the optically effective configuration is permanently fixed and can then be changed only with difficulty. Particularly for audiovisual presentations, such wall elements are not suitable in practice. Although a use as a projection wall for video projectors or the like would be possible, such a use is nevertheless unfavourable for use as a partition or exhibition wall, since an observer would stand in the beam path between the projector and the wall.

Another problem associated with such known wall elements is the problematic cleaning thereof; this is because known wall elements typically have surfaces made of paper, plastic or the like which, besides being of limited quality, in the long term can be kept clean only with difficulty.

Also known from the prior art, for example from German patent application 101 04 644 by the Applicant, are mirrored faces which form a cut-out for placing a screen behind, wherein this screen is then suitable for displaying suitable electronic video media. Such a technology, which would be used for example in the health sector, is nevertheless only suitable to a limited extent as a wall element for interior design.

It is therefore an object of the present invention to provide a large wall element for interior design which on the one hand can be used in a universal and flexible manner as an exhibition, partition or decorative wall or the like, at the same time is suitable for displaying (audio)visual media, and moreover has a surface which is easy to clean and is of high quality.

SUMMARY OF THE INVENTION

The foregoing object is achieved by the wall element according to the invention, wherein a wall panel has a glass outer face which in turn is provided with a decorative design, for example by painting, mirroring, partial mirroring, coating, printing or else placing an inlay or the like behind it. In addition, this wall panel is designed to cooperate with a flat screen in such a way that the decorative design forms a cut-out adapted to the flat screen, through which cut-out the image display can then be viewed on the user side.

Many advantages are obtained in this way: not only is there thus produced a highly decorative and at the same time functional and practical partition wall or interior design object with a high-quality surface which is easy to clean (because it is made of glass), but at the same time the combination of decorative design for the wall panel with a cut-out for the flat screen provides the possibility of flexible visual moving image media with the option of configuring the area around the screen cut-out as a decorative design by means of logos, typefaces, large photo displays or other such designs which are effective in the company or exhibition sector.

Particularly advantageously, it is moreover within the scope of the invention that the flat screen is fitted on the wall panel such that it can be removed. In this way, not only is it possible for the electronic unit to be suitably replaced in the event of a fault, but also a (typically high-quality) flat screen unit can thus suitably be exchanged between a number of wall elements. Solution variants for fitting the electronic unit such that it can be removed may include in particular magnetic fixings or other flexible connection techniques.

The modular encapsulation of the flat screen in the associated housing according to the invention also has an effect with regard to simple handling and easy replacement, wherein the housing may contain all the necessary power supply, control and possibly receiving and/or image generation units, and the provision of a suitable bulk memory for the electronic image display is also conceivable, this being integrated in the housing (for example in the form of a DVD drive). It is also conceivable to allow wireless transmission of image data by suitably incorporating transmitter and receiver units, these also being provided in the encapsulated flat screen.

In an advantageous manner according to the invention, it is moreover possible and provided according to one development to integrate a lighting area into the surface design in such a way that at least one surface cut-out is formed which can be lit from behind by a suitable, preferably flat light source, wherein cold light sources in the form of LEDs, ELs or the like, or alternatively halogen lights, are suitable for example for this purpose. It is likewise conceivable, in addition to the surface designs, also to incorporate other light structures, such as logos, text, star designs or the like for example.

Such an arrangement then expands the usability of the wall element by virtue of an additional lighting functionality, wherein, in one development, it is also possible for suitable light programmes, light colour variants or the like to be suitably preselected or set (perhaps by remote-control). By using light sources, such as LEDs or fluorescent tubes for example, which make it possible to illuminate within a colour spectrum (RGB or the like), the wall element can also serve as a mood lighting means in addition to the aforementioned lighting function. It is possible for the user to set individual colour tones of the wall element. In this case, a remote control of the flat screen, which can be used according to one development, performs two functions at the same time: on the one hand the remote control can be used to control the functionality of the screen unit, and on the other hand it is possible to control the lighting means by virtue of this remote control, e.g. setting colour patterns, switching the light sources on and off, etc. Compared to conventional systems, the system is thus very convenient for the user to operate, since just one remote control is required. The remote control may be designed in the customary transmission methods—infrared, radio or the like.

Within the scope of the present invention, on account of the obvious advantages of the at least one lighting area which is integrated in the wall element and is lit from behind, independent protection is claimed for a particular embodiment in which the decorative surface design is replaced by full or partial mirroring.

The present invention can be further configured by means of numerous modifications and variants; for example, it is possible in particular to provide a plurality of cut-outs on the large wall panel, which cut-outs in turn in each case have associated, suitably adapted flat screens placed behind them (alternatively: combinations of lighting areas and screen areas); one particularly favourable decorative effect is moreover achieved in that the cut-outs are visually adapted to the surrounding decorative design and/or dimensions of the plurality of cut-outs are suitably varied for the electronic image display.

All customary fixing systems for glass, such as frame profiles, magnets, hanging systems, etc., are conceivable as a fixing, hanging or frame system for the present wall element.

In particular, the wall element may also be fitted into an independent display or exhibition system. In this way, a promotional and/or advertising display for use at exhibitions, points of sale or the like is produced. In this connection, it is useful to further configure the wall element with product designs. For example, the wall element may be provided with product designs—by gluing, printing or integrating them, etc.—which when touched or otherwise activated play a given sequence in the provided screen unit of the wall element. An advertising display is thus produced which can cover extensive, customer-specific possibilities in terms of sales requirements on the one hand by configuring the element surface in terms of design and colour, by applying product designs, and on the other hand by virtue of the audiovisual display possibilities of the screen unit which is present.

The (external) shape is to be regarded as a further possibility for variation of the wall element. This may have any conceivable shape, whether round, oval, square, etc. The copying of a two-dimensional product design is also conceivable: the shape of the wall element corresponds in this case to that of the selected product design, and the surface configuration of the wall element corresponds to the surface configuration of the product design. The integrated screen unit could in this case display product-related information which can be controlled for example via so-called content management systems.

It is also within the scope of the present invention, according to one development, to integrate a door or a window in the wall element so that the architectonic use possibilities of the present invention can be considerably expanded beyond a partition wall or display functionality. A pivoting and/or opening mechanism for such a door or window (17) construction would be suitably integrated in the wall element, as out of sight as possible from the user in front of the outer face.

It is likewise conceivable to place a large number of wall elements flush next to one another, in order in this way to be able to cover a large area by virtue of a modular construction. The design of the individual wall element in this case corresponds to part of the overall impression. Especially in modern interior architecture, a large number of design variants can thus be covered.

Particularly with regard to uses of the present invention in wet areas, it is moreover possible for either the wall element as a whole or alternatively the housing of the flat screen to be designed to be suitably splash-proof or alternatively watertight or steam-tight. In the following examples of embodiments, one possible manner of protecting the screen against jets of water and against being submerged in water is described in connection with the wall element.

It is also within the scope of the invention, according to one development, in addition to the image display according to the invention also to provide an audio output, preferably by providing on the rear at least one (preferably flat) behind-glass loudspeaker unit, and to provide this for example in a manner hidden behind the design. So-called flat loudspeakers could be used here in particular.

On account of the video and possibly audio devices which are largely integrated in the wall element, fixed control elements on the outer face would usually be disruptive. According to one preferred development, therefore, a wireless remote-control unit is preferably assigned to the invention, which controls the operating parameters at least of the screen unit, but ideally also of an associated audio output unit and/or integrated lighting units, wherein particularly favourable parameter combinations also exist in the form of preset programmes and can be selected in a remote-controlled manner.

As a result, the present invention provides a wall element which can advantageously be used as a room divider, partition wall, decorative element, wall or bathroom mirror, sales display, exhibition wall or the like, and combines flexible display possibilities using modern electronic media with a high-quality surface which is easy to clean.

BRIEF DESCRIPTION OF THE DRAWINGS

Further advantages, features and details of the present invention emerge from the following description of preferred examples of embodiments and with reference to the drawings; in the drawings.

DETAILED DESCRIPTION

Figure 1:
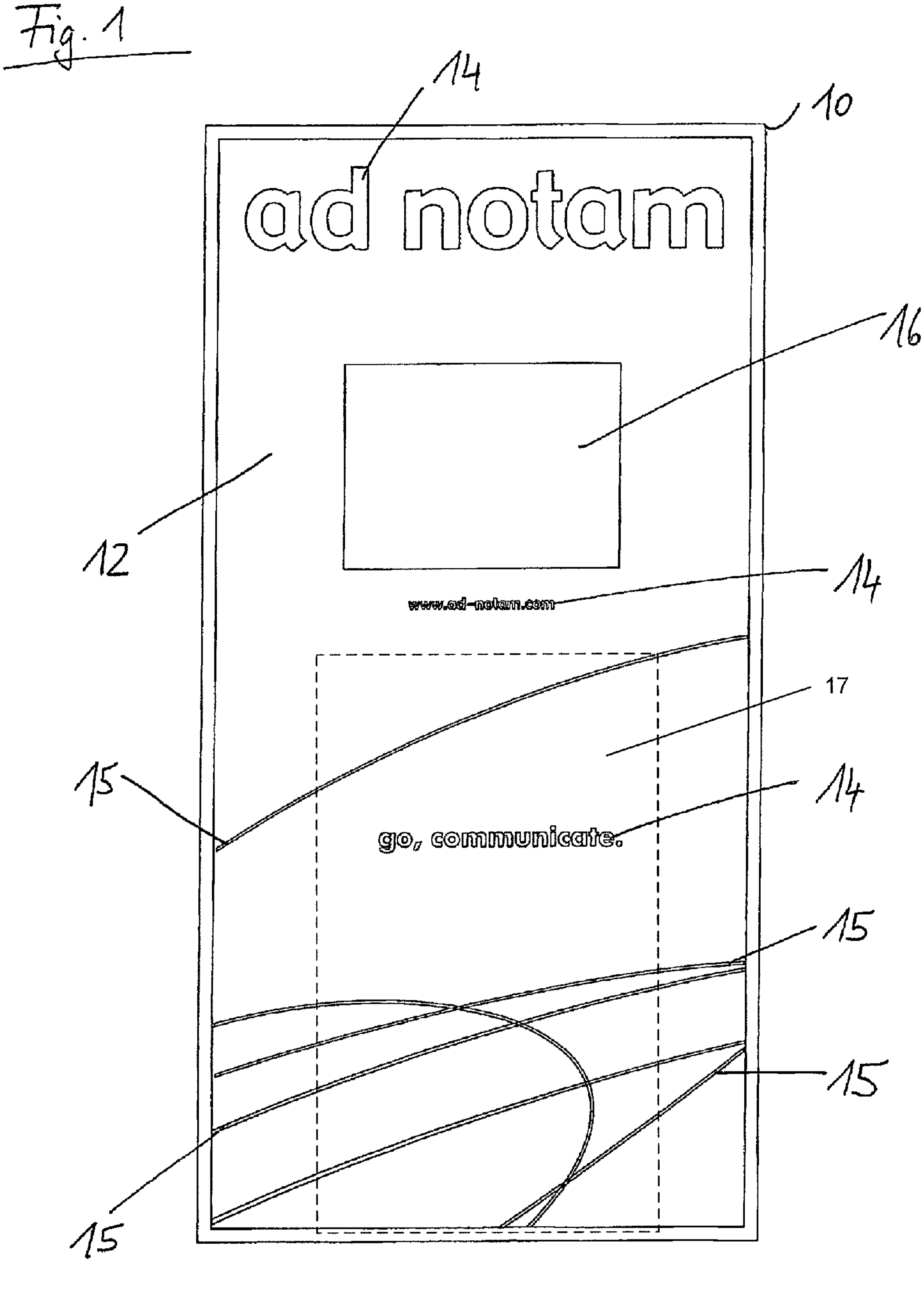
FIG 1: shows a modular large wall element according to a first preferred embodiment of the present invention.

FIG. 1 shows a modular large wall element as a room divider according to a first preferred embodiment of the present invention. A metal frame 10 which is approximately 2 m high surrounds a glass panel 12 which is treated on its rear and is provided on its rear with a decorative colour by being printed over its entire area, wherein at the same time further design features 15 and letters 14 are formed for advertising purposes within the wall element by changing the colour tone or by partial mirroring.

The glass panel 12 patterned in this way has, as shown, a cut-out 16 which is dimensioned to receive a 30-inch TFT colour screen, wherein the cut-out 16 is formed as an area of the glass panel 10 which is left free in the colour design 12, 14, 15.

Placed behind this cut-out 16 is a flat screen which is accommodated in a special screen housing additionally comprising suitable power supply and control electronics, said flat screen being known from the prior art and being provided to display various electronic video signals on its screen face which faces the rear side of the wall panel 10 in the region of the cut-out 16. More specifically, such a screen unit accommodated in a housing is releasably fixed to the rear of the wall panel so that the screen surface of the TFT display bears flush against the inner face of the glass.

Figure 3:
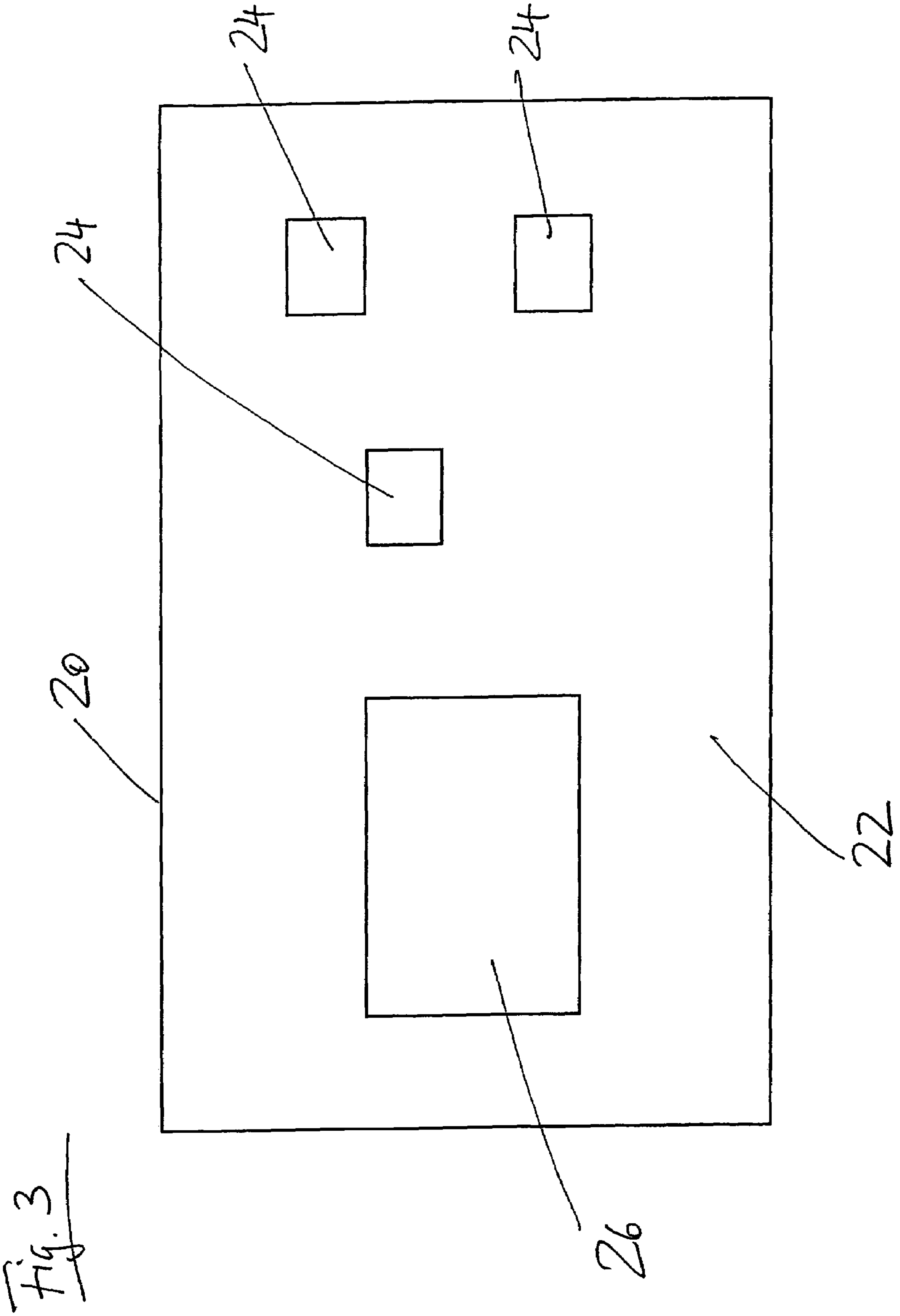
FIG. 3: shows a variant of the embodiment of FIG. 1 with a plurality of display areas distributed over the wall panel, wherein these display areas are of different sizes.

FIG. 3 shows a variant of the arrangement of FIG. 1. The wall element 20, which appears to be frameless, has a monochromatic background colouring as the design 22. Cut-outs 24, 26 are formed in the design, with a flat screen of associated size being placed behind each of the cut-outs, wherein the central cut-out 26 has a larger screen diagonal than three smaller screens arranged on either side thereof.

The illustrated design which runs in the transverse direction is highly suitable, as shown, as a background wall for conference situations or other such business purposes.

Figure 2:
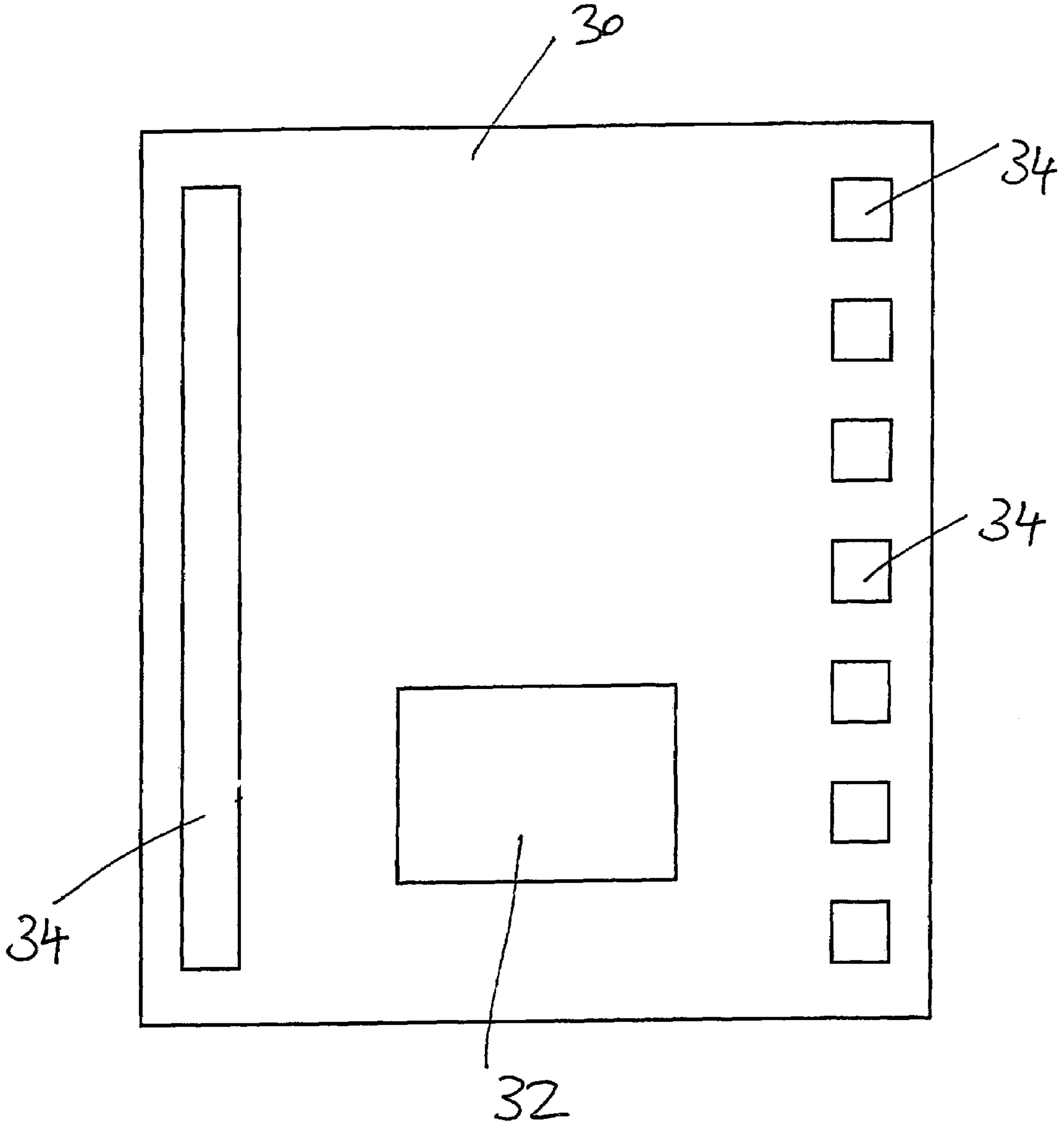
FIG. 2: shows a large wall element according to a second embodiment with, compared to the diagram in FIG. 1, lighting areas additionally provided in the lateral edge region.

FIG. 2 shows an alternative embodiment within the scope of the present invention, Here, a flat glass panel 30 is mirrored and has a cut-out 32 for a flat screen. On either side along the longitudinal edge, recesses 34 of varying shape shown by way of example are formed in the mirroring, which recesses are lit from behind by light sources in order to produce lighting areas. A wall element which integrates a light source is thus produced in the manner shown.

Figure 4:
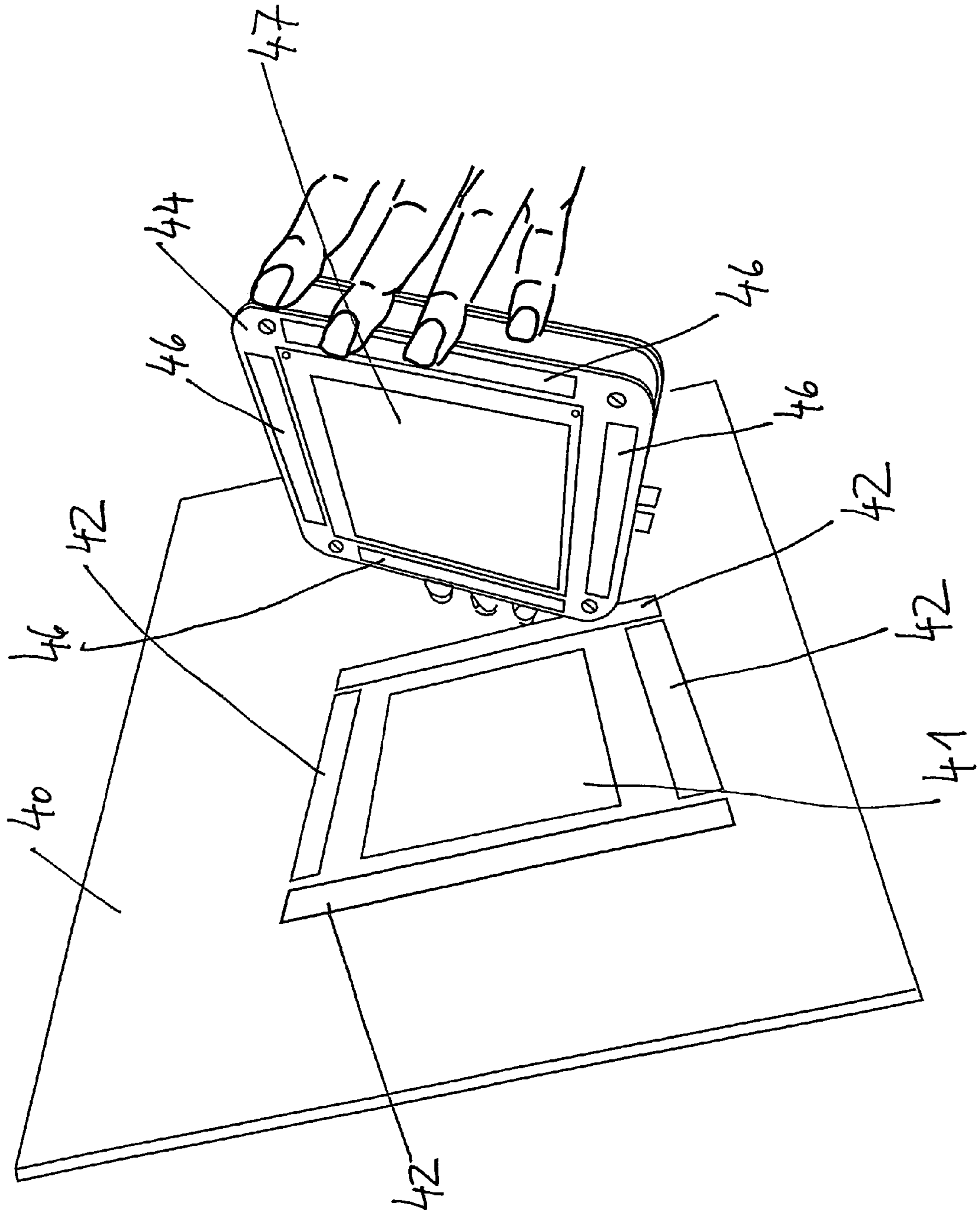
FIG. 4: shows a schematic rear view to illustrate the removable fixing possibility of the flat screen in the embodiments of FIGS. 1 to 3, and FIG. 5: shows a variant of the embodiment of FIG. 1 with an integrated screen unit and a plurality of product designs arranged over the wall element.

FIG. 4 shows, on the basis of a further example, a rear configuration of the wall element according to the invention. A glass panel 40 (which is provided with a design (not shown) in the manner described above) is provided with a transparent cut-out for the image display 41, said cut-out being made in the design. Lead strips 42 are fitted around the viewing area 41 as an adhesive base for fixing a flat screen housing 44. Here, the flat screen housing 44 is thus equipped with magnetic strips 46 in order to produce a releasable adhesion between the lead strips 42 and the flat screen housing 44. The flat screen housing 44 can thus be removed again subsequently by using the magnets 46. The screen face 47 of the flat screen housing 44 can as a result be easily aligned in the viewing area 41 of the glass panel 40.

Figure 5:
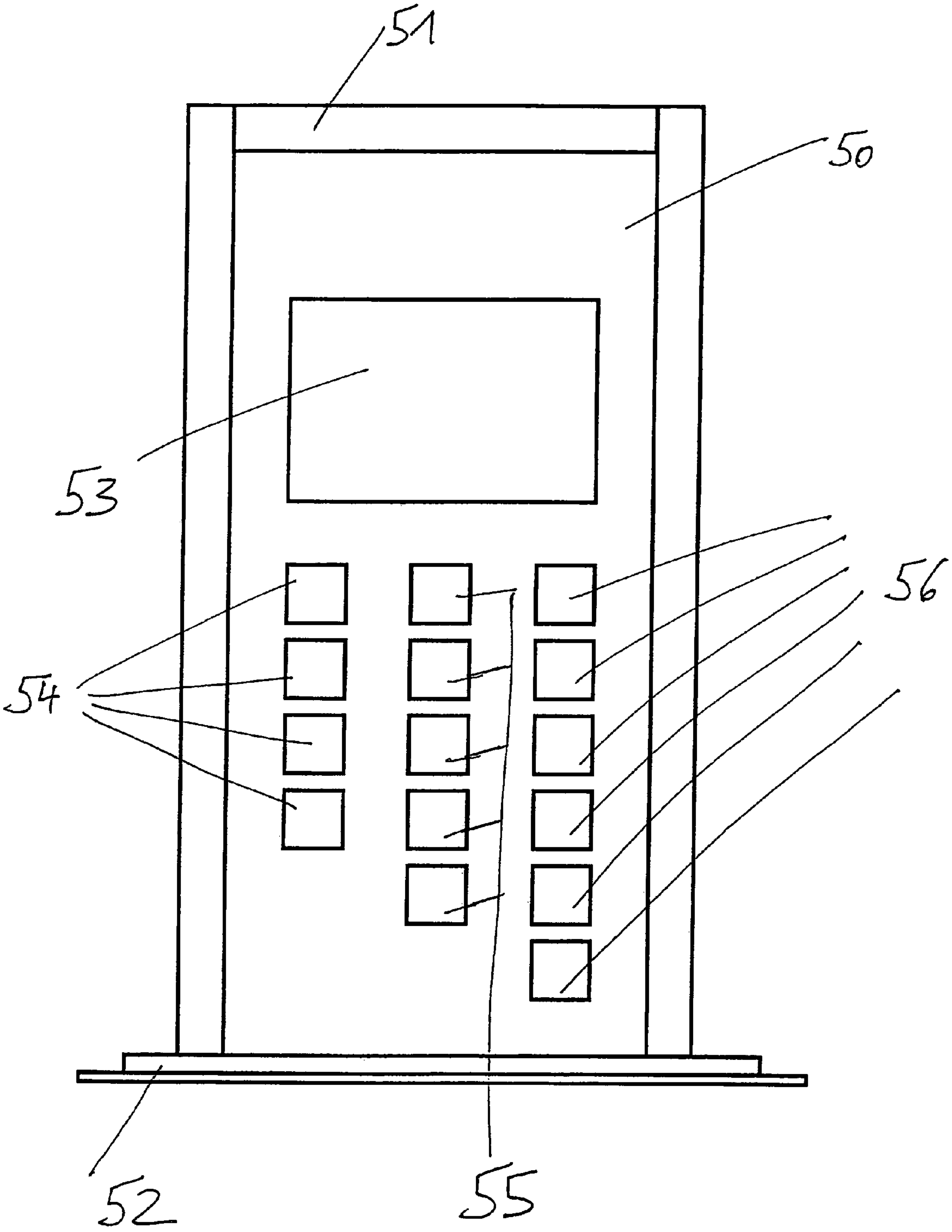

FIG. 5 shows a wall element 50 with viewing area 53 for a screen unit fitted on the rear, which wall element is placed in a frame system 51 of a display or exhibition. FIG. 5 also shows a base or stand unit 52, by means of which the wall panel 50 held in the frame 51 can be positioned anywhere in rooms and can thus be used as a room divider. In addition, the wall element 50 is provided with a number of product designs 54, 55, 56. In this case, the product designs 54 are printed onto the wall element and provided with a heat or contact sensor. The product designs 55 are incorporated in the wall element and are provided with a motion detector, and the product designs 56 are applied to the surface of the wall element 50 and are provided with a light barrier. When individual product designs are touched, information or a sequence associated with the product design 54, 55, 56 is automatically played in the viewing area 53 of the flat screen, by virtue of a connected computer or playback unit, e.g. a DVD player, PC or the like.

Figure 6:
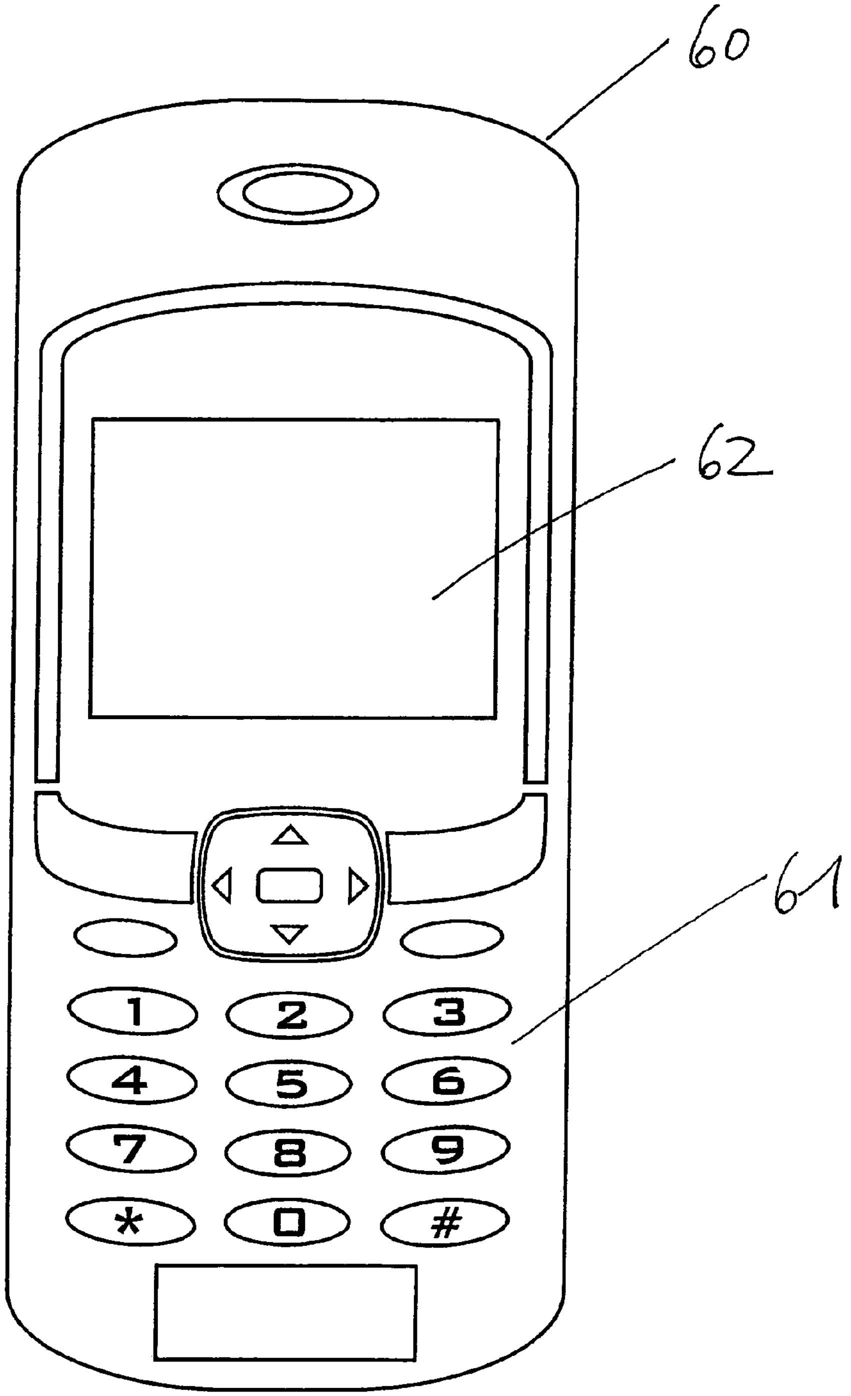
FIG. 6: shows a variant of the embodiment of FIG. 1 in the shape of an arbitrary product design.

FIG. 6 shows a wall element 60 in the shape of an arbitrary product design—in the example of embodiment as a mobile telephone. In this case, the shape of the wall element is modelled on that of the actual mobile telephone. The rear of the wall element made of glass 61 is printed in accordance with the surface of the selected product design. A transparent or partially transparent cut-out 62 is provided within the surface 61 of the wall element for placing a flat screen behind the latter, said screen being provided for continuous image display.

Figure 7:
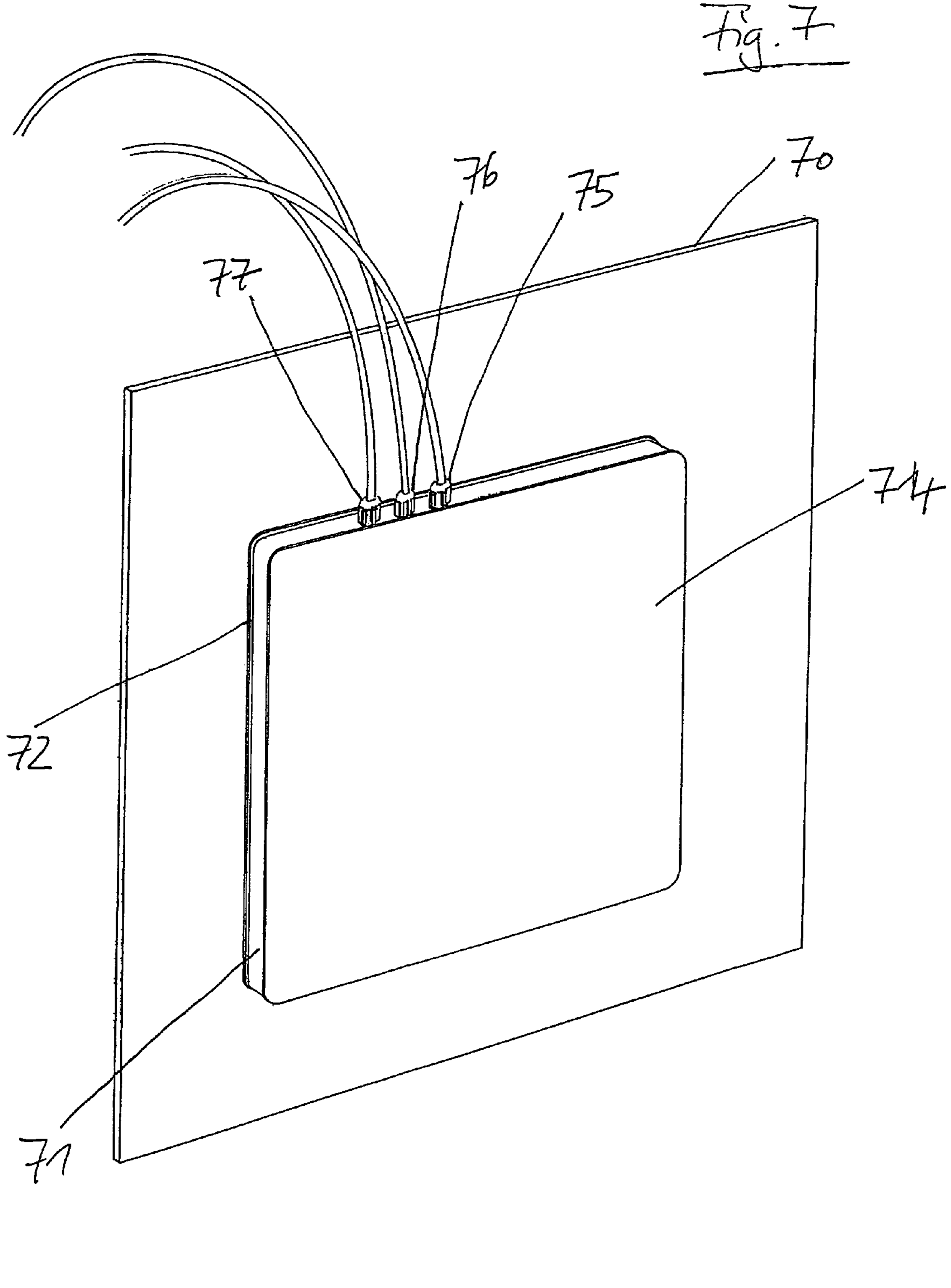
FIG. 7: shows a rear view to illustrate an embodiment which is protected against jets of water and against being submerged in water, with a fitted flat screen and cables.

FIG. 7 shows a wall element 70 in a design protected against jets of water and against being submerged in water, according to IP protection class X5 and above. Here, a housing 71 of a flat screen which is fitted on the rear of the glass or wall element 70 is connected to the rear of the glass element 70 in such a way that it is not possible for water to enter the interior of the flat screen 71 via the side or the rear. By way of example, gluing or other sealing materials are possible as customary possibilities for sealing the interface 72 between the flat screen 71 and the glass element 70. In the case of gluing, the rear panel 74 of the flat screen housing 71 is designed to be removable—but nevertheless water-tight—in order to allow access to the electronic components of the flat screen in the event of a fault. It is not possible for water to enter the interior of the flat screen via the front since the front is placed against the glass element 70. The illustrated connection configuration 75, 76, 77 of the flat screen, consisting of a DC 12V connection 75, a video connection 76 and a TV connection 77, is equipped with special water-tight connectors so that it is also not possible for water to enter there. The connectors 75, 76, 77 are equipped with extension cables having a minimum length of 1.80 m.

Figure 8:
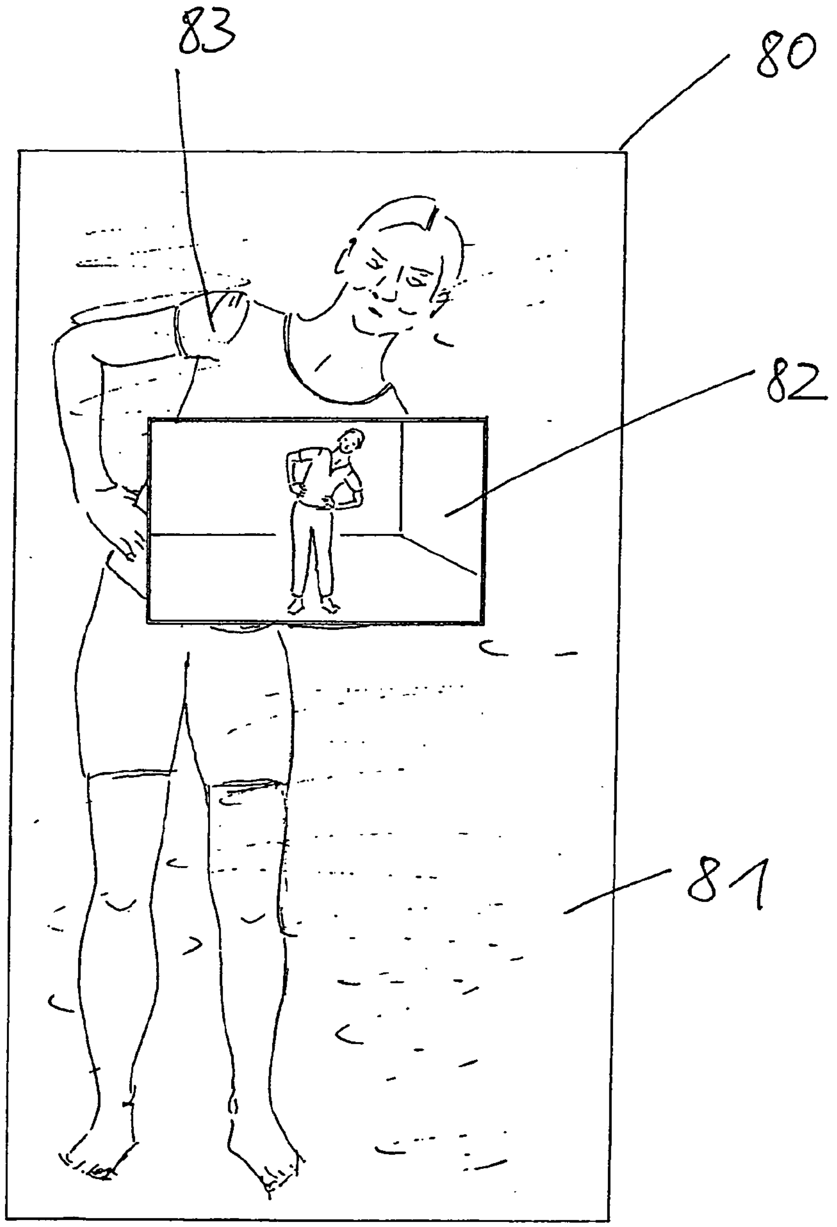
FIG. 8: shows a further use example in mirror form.

FIG. 8 shows a wall element 80 with a mirrored surface 81 and an integrated viewing area 82 for displaying information. In this example of embodiment, fitness exercises for example are displayed to the viewer in the viewing area 82. By reflection of his mirror image 83 in the wall element 80, the viewer can optimize and improve the sequence of moves of his fitness exercise on the basis of the displayed information 82. In addition, it is conceivable to provide the wall element with sensors so that the viewer, when carrying out incorrect moves, is shown information or warnings in the viewing area 82. In addition to the fitness sector, this technology can be used wherever movement sequences are to be mapped and optimized.

The present invention is not restricted to the illustrated embodiments; for example, numerous other embodiments are conceivable, as are other use forms beyond the office, exhibition and home and bathroom sectors.

The invention claimed is:

1. A modular large wall element for interior design, comprising a wall panel (12) which has a decorative surface design (14) and forms at least one display area (16) for a screen, wherein the wall panel on the user side has a glass outer face which is provided with the decorative surface design (14) by full or partial painting, backing, etching, sandblasting and/or metallization of the wall panel, in particular on the rear face of the wall panel opposite the outer face, and the display area is formed as at least one cutout (16) in the surface design, which cut-out is assigned on the rear a flat screen for displaying an electronic image through the glass outer face, said screen being encapsulated in a modular manner in a housing and fitted such that it can be removed, said wall panel having provision for remote control including a wireless transmission of image data.

2. A wall element according to claim 1, wherein the decorative surface design comprises a logo, a text, individual letters, photographs, coloured areas and/or combinations of these.

3. A wall element according to claim 1, including at least one lighting area (34) integrated in the surface design preferably at the edge thereof, said lighting area being formed in a transparent or partially transparent manner by a cut-out in the surface design and being lit from behind by a preferably remote controlled artificial light source.

4. A wall clement according to claim 3, wherein the artificial light source comprises halogen LED and/or multicoloured lights which are designed such that they can preferably be activated in a choice of lighting states.

5. A wall element according to claim 1, wherein the glass outer face is tempered or coated with an anti-reflection coating.

6. A wall element according to claim 1 wherein the housing of the flat screen is designed to be splash-proof or water-tight and/or steam-tight.

7. A modular large wall element for interior design, comprising a wall panel which has a decorative mirroring and at least one display area for a screen, wherein the wall panel on the user side has a glass outer face which forms the decorative mirroring by full or partial mirroring, in particular on the rear face of the wall panel opposite the outer face, and the display area is formed as at least one cutout in the decorative mirroring, which cut-out is assigned on the rear a flat screen for displaying an electronic image through the glass outer face, said screen being encapsulated in a modular manner in a housing and fitted such that it can be removed, characterized by at least one lighting area in the mirroring, said lighting area being formed in a transparent or partially transparent manner by a cutout in the mirroring and being lit from behind by a preferably remote-controlled artificial light source said wall panel having provision for remote control including wireless transmission of image data.

8. A wall element according to claim 7, wherein a door and/or window designed for pivotable opening is integrated in the wall panel.

9. A wall element according to claim 7, including a plurality of display areas, each of which is assigned a flat screen.

10. A wall element according to claim 7, wherein the wall element and/or the housing of the flat screen is designed to be splash-proof or water-tight and/or steam-tight.

11. A wall element according to claim 7, including acoustic means for behind-glass acoustic irradiation of a space in front of the glass outer face, which acoustic means can be controlled by electronic audio signals.

12. A wall element according to claim 7, including a preferably splash-proof and/or water-tight remote-control unit for activating an operating state of the flat screen.

13. A wall element according to claim 12, wherein the remote control is designed to additionally control a light source, in particular light and colour patterns of a light source, which light source is assigned to a lighting area of the wall element.

14. A wall element according to claim 7, wherein the wall element is designed as a room divider, partition wall and/or exhibition wall and according to one development is provided with base or stand elements.

15. A wall element according to claims 7, wherein the wall element is designed to cooperate with and/or fit into an exhibition, installation or stand system.

16. A wall element according to claim 7, wherein the wall element is designed to cooperate in a flush manner, preferably without any overhangs or transitions, with an adjacent wall element and to form at least one overall surface.

17. A wall element according to claim 7, wherein the wall element has an outer contour which is modelled on a physical product, in particular telecommunication devices or electrical devices.

18. A wall element according to claim 7, wherein the wall element has at least one holder for a physical product which can he exhibited in a decorative manner.

* * * * *